(12) United States Patent
Mohan et al.

(10) Patent No.: US 12,650,825 B2
(45) Date of Patent: Jun. 9, 2026

(54) SYSTEM AND METHOD FOR OPTIMIZED GENERATION OF CLOUD DEPLOYMENT CONFIGURATIONS FOR AN APPLICATION

(71) Applicant: Cognizant Technology Solutions India Pvt. Ltd., Chennai (IN)

(72) Inventors: Karthikeyan Mohan, Chennai (IN); Selvaraj Natarajan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 289 days.

(21) Appl. No.: 18/586,859

(22) Filed: Feb. 26, 2024

(65) Prior Publication Data

US 2025/0208843 A1    Jun. 26, 2025

(51) Int. Cl.
*G06F 8/60* (2018.01)

(52) U.S. Cl.
CPC ..................................... *G06F 8/60* (2013.01)

(58) Field of Classification Search
None
See application file for complete search history.

(56) References Cited

U.S. PATENT DOCUMENTS

| | | | | |
|---|---|---|---|---|
| 9,904,530 | B2 * | 2/2018 | Chen | .......................... G06F 8/60 |
| 10,193,961 | B2 * | 1/2019 | Frank | .................. H04L 41/5048 |
| 10,225,335 | B2 * | 3/2019 | Fu | .......................... G06F 9/5072 |
| 11,281,503 | B2 * | 3/2022 | Giannetti | ............ G06F 11/3006 |
| 2011/0225579 | A1 * | 9/2011 | Khandelwal | .............. G06F 8/60 717/177 |
| 2017/0300309 | A1 * | 10/2017 | Berger | .................... H04L 63/20 |

OTHER PUBLICATIONS

Li, "Service Mesh: Challenges, State of the Art, and Future Research Opportunities", 2019, IEEE (Year: 2019).*
Deploy Kubernetes Across Multi-Cloud Environments D2iQ, Mar. 11, 2021; URL: https://d2iq.com/blog/how-to-successfully-deploy-kubernetes-across-multi-cloud-environments.

* cited by examiner

*Primary Examiner* — Hossain M Morshed
(74) *Attorney, Agent, or Firm* — CANTOR COLBURN LLP

(57) ABSTRACT
A system and method for optimized generation of cloud deployment configurations for an application is provided. The invention provides for receiving parameters associated with application deployment configuration generation and deployment of application on a target cloud platform. The parameters are processed for generating an application source code template. Cloud deployment configuration is generated based on generated application source code template. Package deployment associated with application deployment is automated by integrating with Application Programing Interfaces (API) for abstracting packaging applications to be deployed on target cloud platform. Pipeline inputs associated with target cloud platform are processed for determining cloud deployment configuration constraints associated with application source code. Service mesh configuration files are generated for deployment of application to target cloud platform by processing cloud deployment configuration constraints associated with application source code. A cloud deployment template is generated for deploying application associated with application source code to target cloud platform.

30 Claims, 11 Drawing Sheets

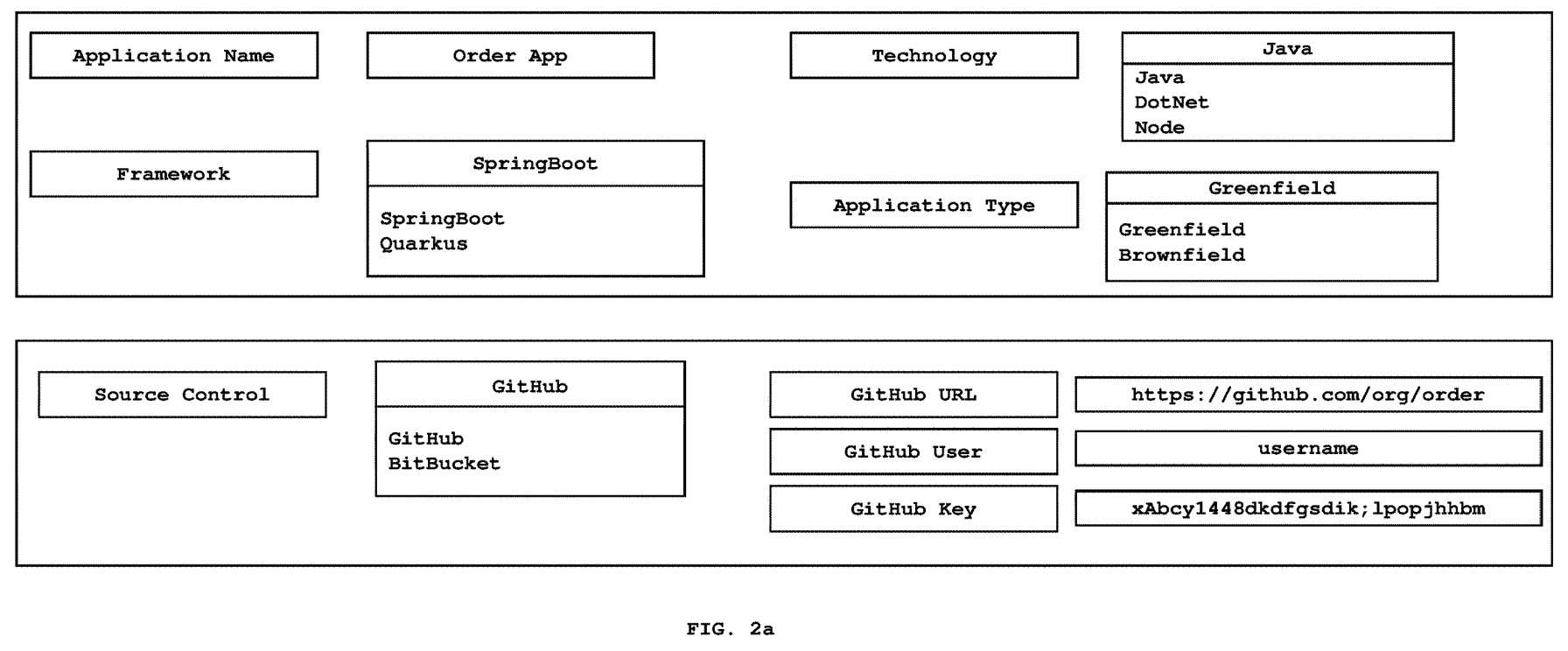

Application Name

Order App

Technology

Java

| Java |
| DotNet |
| Node |

Framework

SpringBoot

SpringBoot

| SpringBoot |
| Quarkus |

Application Type

Greenfield

| Greenfield |
| Brownfield |

Source Control

GitHub

GitHub

| GitHub |
| BitBucket |

GitHub URL https://github.com/org/order

GitHub User username

GitHub Key xAbcy1448dkdfgsdik;lpopjhhbm

FIG. 2a

Figure 2B:
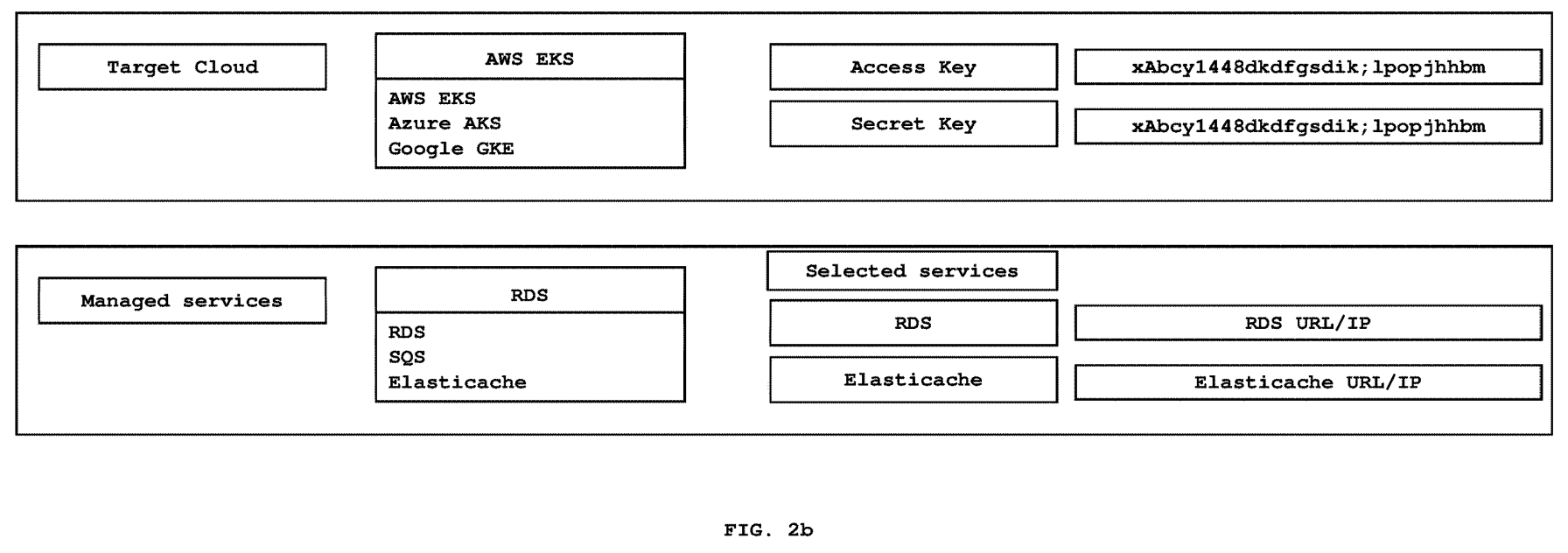

Target Cloud

AWS EKS

AWS EKS
Azure AKS
Google GKE

Access Key    xAbcy1448dkdfgsdik;lpopjhhbm

Secret Key    xAbcy1448dkdfgsdik;lpopjhhbm

Managed services

RDS

RDS
SQS
Elasticache

Selected services

RDS    RDS URL/IP

Elasticache    Elasticache URL/IP

SYSTEM AND METHOD FOR OPTIMIZED GENERATION OF CLOUD DEPLOYMENT CONFIGURATIONS FOR AN APPLICATION

CROSS REFERENCE TO RELATED APPLICATION

This application is related to and claims the benefit of Indian Patent Application number 202341087107 filed on Dec. 20, 2023, the contents of which are herein incorporated by reference in their entirety.

FIELD OF THE INVENTION

The present invention relates generally to the field of cloud deployment configurations. More particularly, the present invention relates to a system and a method for optimized generation of cloud deployment configurations for an application.

BACKGROUND OF THE INVENTION

Various enterprises are moving large volumes of their computing applications to cloud platforms (such as, Kubernetes, etc.) for efficient management of applications. Deployment of applications to the cloud platform requires generation of new configurations for running the applications in the cloud. Such cloud deployment configurations may include, but are not limited to, Dockerfile®, Kubernetes deployment Yet Another Markup Language (YAML)®, service mesh YAMLs®, Helm®, etc. However, generation of cloud deployment configurations involve various complexities. The complexities may relate to suitably analyzing the application for which the cloud deployment configurations are being generated. The cloud deployment configurations need to appropriately define the target cloud platform/cluster to which the application needs to be deployed. The cloud deployment configurations require to define the best practices associated with management of cloud deployment configuration files. Further, the cloud deployment configurations need to adhere to the defined enterprise standards associated with application cloud deployment. Furthermore, the generated cloud deployment configurations need to be maintained and updated with respect to the application changes. Also, the cloud deployment configurations must be customizable individually for each application. Further, the cloud deployment configurations must be able to manage multiple configuration file types (e.g., service mesh) in addition to Docker® and Kubernetes®.

Further, developers go through a steep learning curve for generating cloud deployment configurations. As such, the learning requirement coupled with the aforementioned complexities distract the developers from focusing on the functional and operational features that need to be delivered. It has also been observed that existing tools or framework do not provide application creation and deployment to cloud platform in a multi-cloud provider platform. Furthermore, existing tools do not allow the enterprise to define their own standards for cloud deployment configurations. Yet further, the existing tools do not provide flexibility to cater to specific needs of the enterprise associated with cloud deployment configurations. It has also been observed that some of the cloud deployment configuration tools are open sourced and not maintained for a long time. Yet further, existing tools generally manipulate the YAML® and do not abstract the application packaging.

In light of the aforementioned drawbacks, there is a need for a system and a method which provides for optimized generation of cloud deployment configurations for an application. There is a need for a system and a method which provides for optimally addressing complexities of generating and maintaining the cloud deployment configurations, with minimum human intervention. Further, there is a need for a system and a method which provides for automated application creation and deployment to cloud platform in a multi-cloud provider platform. Furthermore, there is a need for a system and a method which provides for defining cloud deployment configurations standards by the enterprise. Yet further, there is a need for a system and a method which provides for abstracting the application packaging associated with cloud deployment configurations.

SUMMARY OF THE INVENTION

In various embodiments of the present invention, a system for optimized generation of cloud deployment configurations for an application is provided. The system comprises a memory storing program instructions, a processor (106) executing instructions stored in the memory and a cloud deployment configuration generation engine. The cloud deployment configuration generation engine is configured to receive one or more parameters associated with application deployment configuration generation and deployment of the application on a target cloud platform. The cloud deployment configuration generation engine is configured to process the one or more parameters for generating an application source code template. Further, the cloud deployment configuration generation engine is configured to generate cloud deployment configuration files based on the generated application source code template. Further, the cloud deployment configuration generation engine is configured to automate package deployment associated with the application deployment by integrating with Application Programing Interfaces (API) for abstracting packaging applications to be deployed on the target cloud platform. Further, the cloud deployment configuration generation engine is configured to process one or more pipeline inputs associated with the target cloud platform for determining one or more cloud deployment configuration constraints associated with the generated cloud deployment configuration files corresponding to an application source code. Further, the cloud deployment configuration generation engine is configured to generate service mesh configuration files for deployment of the application on the target cloud platform by processing the one or more cloud deployment configuration constraints associated with the application source code. Lastly, the cloud deployment configuration generation engine is configured to generate a cloud deployment template for deploying the application associated with the application source code on the target cloud platform.

In various embodiments of the present invention, a method for optimized generation of cloud deployment configurations for an application is provided. The method is implemented by a processor executing instructions stored in a memory. The method comprises receiving one or more parameters associated with application deployment configuration generation and deployment of the application on a target cloud platform. The method comprises processing the one or more parameters for generating an application source code template. The method comprises generating cloud deployment configuration files based on the generated application source code template. The method comprises automating package deployment associated with the application deployment by integrating with Application Programing Interfaces (API) for abstracting packaging applications which are targeted to be deployed on the target cloud platform. Further, the method comprises processing one or more pipeline inputs associated with the target cloud platform for determining one or more cloud deployment configuration constraints associated with the generated cloud deployment configuration files corresponding to an application source code. Further, the method comprises generating service mesh configuration files for deployment of the application on the target cloud platform by processing the one or more cloud deployment configuration constraints associated with the application source code. Lastly, the method comprises generating a cloud deployment template for deploying the application associated with the application source code on the target cloud platform.

In various embodiments of the present invention, a computer program product is provided. The computer program product comprising a non-transitory computer-readable medium having computer program code stored thereon, the computer-readable program code comprising instructions that, when executed by a processor, causes the processor to receive one or more parameters associated with application deployment configuration generation and deployment of the application on a target cloud platform. The one or more parameters are processed for generating an application source code template. Cloud deployment configuration files are generated based on the generated application source code template. Further, package deployment associated with the application deployment is automated by integrating with Application Programing Interfaces (API) for abstracting packaging applications to be deployed on the target cloud platform. Further, one or more pipeline inputs associated with the target cloud platform are processed for determining one or more cloud deployment configuration constraints associated with the generated cloud deployment configuration files corresponding to an application source code. Further, service mesh configuration files are generated for deployment of the application to the target cloud platform by processing the one or more cloud deployment configuration constraints associated with the application source code. Lastly, a cloud deployment template is generated for deploying the application associated with the application source code to the target cloud platform.

BRIEF DESCRIPTION OF THE ACCOMPANYING DRAWINGS

The present invention is described by way of embodiments illustrated in the accompanying drawings wherein:

FIGS. 2a-2d illustrates an exemplary GUI rendered on the user device for capturing input data associated with the application generation and deployment to the cloud platform, in accordance with an embodiment of the present invention;

DETAILED DESCRIPTION OF THE INVENTION

The present invention discloses a system and a method which provides for optimized generation of cloud deployment configurations for an application. The present invention discloses a system and a method which provides for optimally addressing complexities of generating and maintaining the cloud deployment configurations for providing a better developer experience with respect to deploying applications to the cloud platform with minimum human intervention. The present invention discloses a system and a method which provides for automated creation of application deployment configuration in a multi-cloud provider platform. The present invention discloses a system and a method which provides for defining cloud deployment configurations standards by the enterprise. Furthermore, the present invention discloses a system and a method which provides for abstracting the application packaging associated with creation of cloud deployment configurations.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
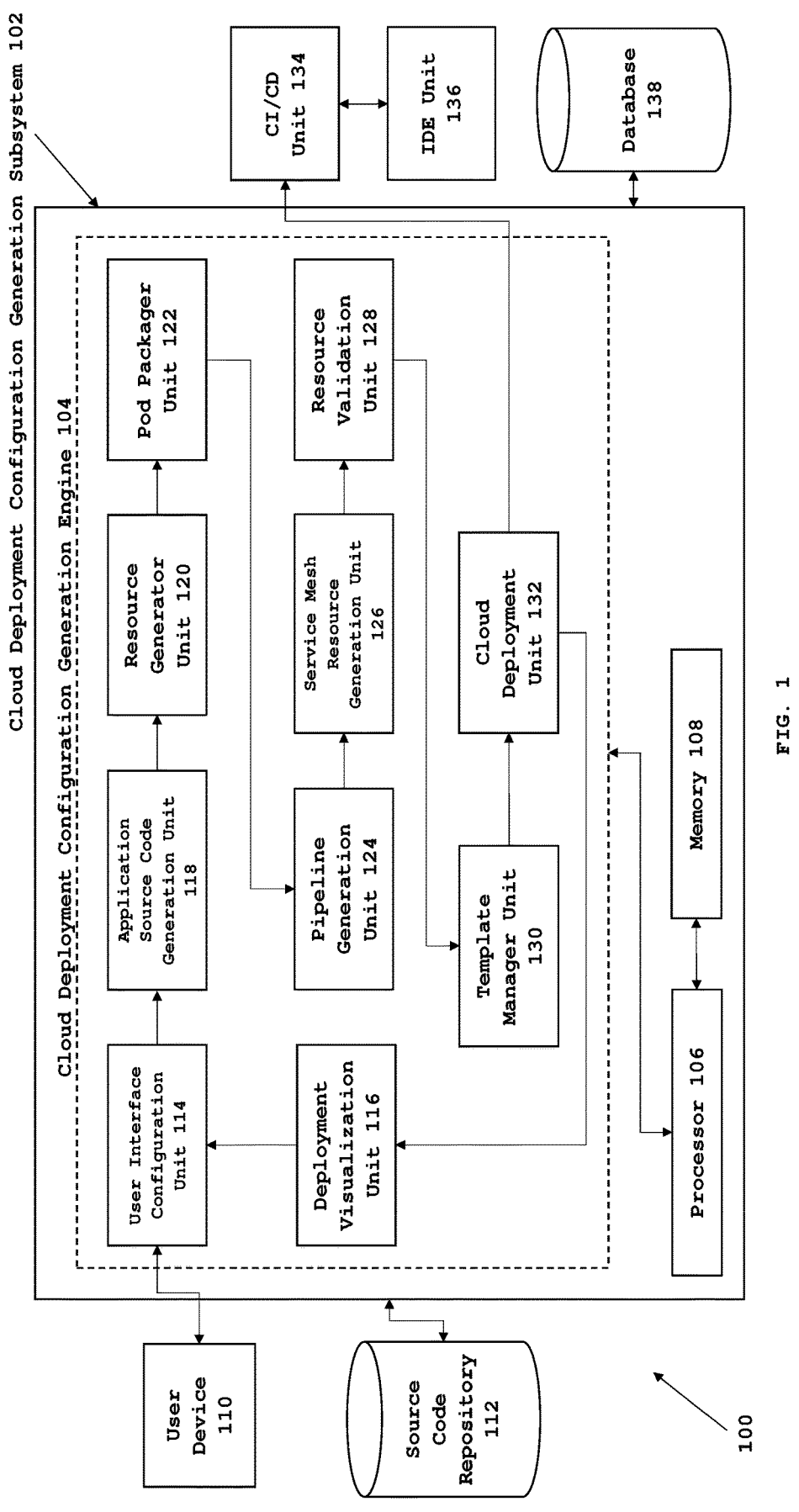
FIG. 1 is a detailed block diagram of a system for optimized generation of cloud deployment configuration for an application, in accordance with an embodiment of the present invention.
Figure 2C:
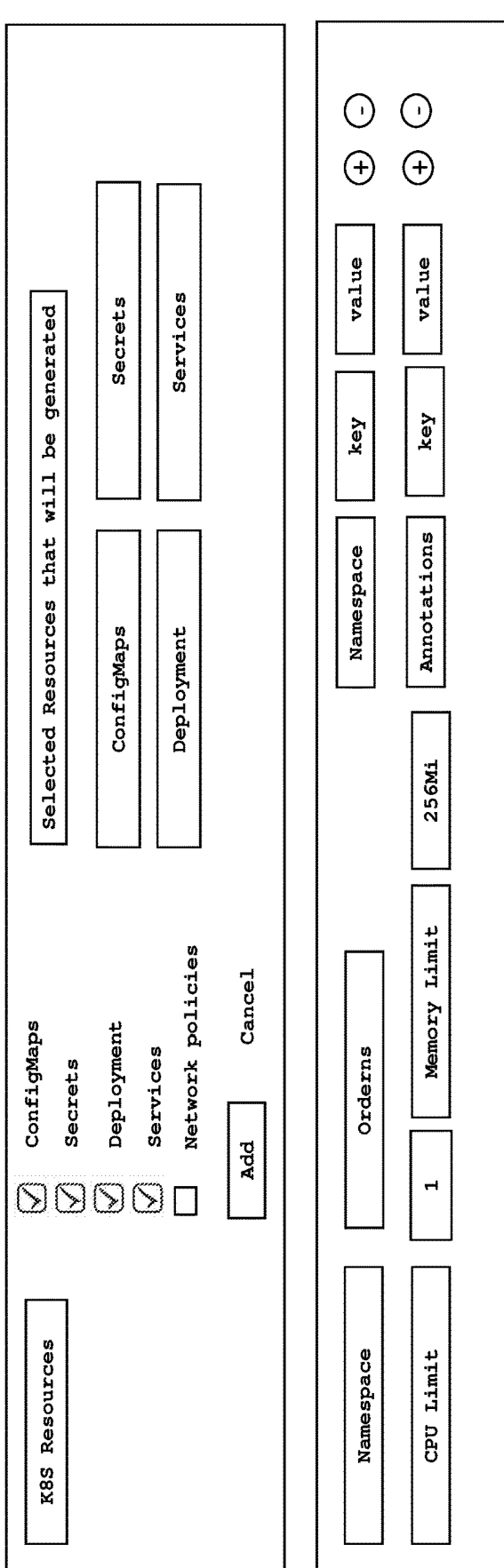
Figure 2D:
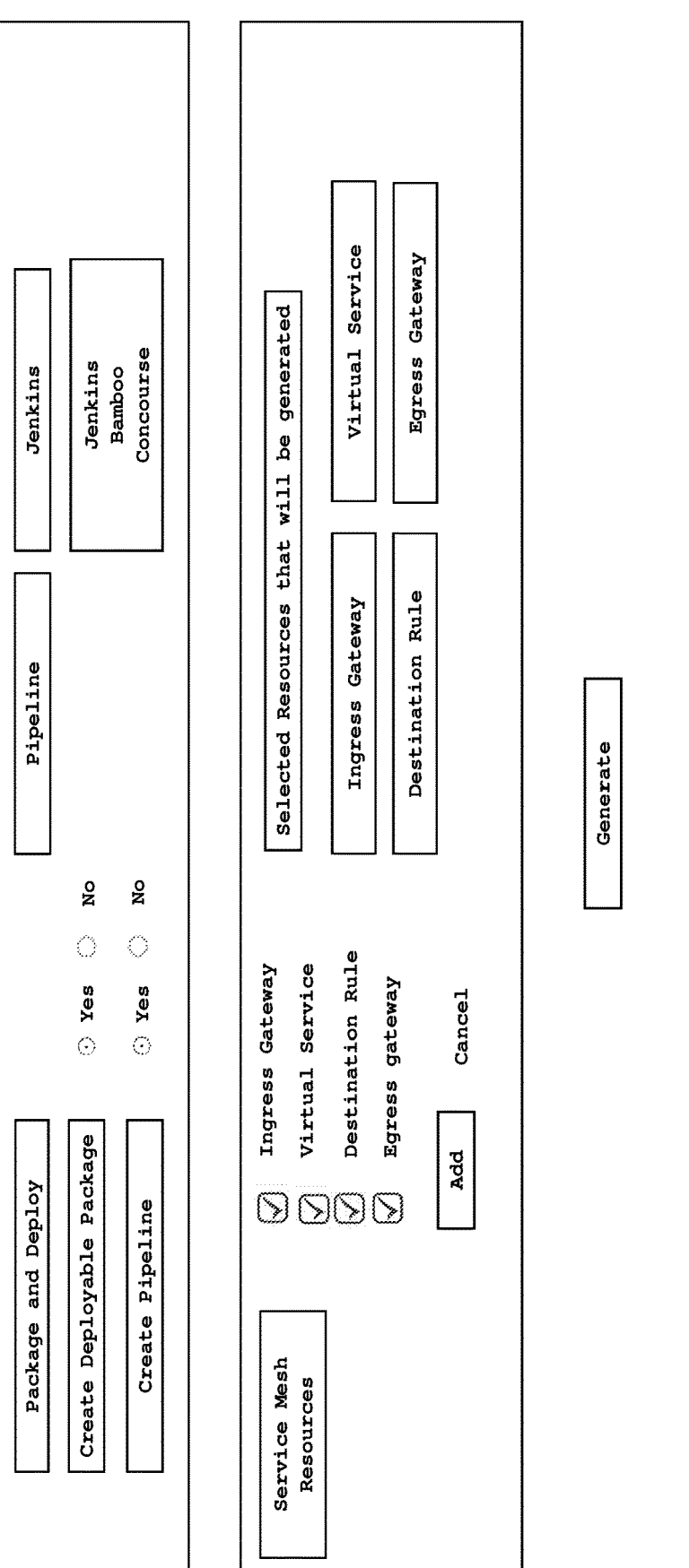

FIG. 1 is a detailed block diagram of a system 100 for optimized generation of cloud deployment configurations for an application, in accordance with various embodiments of the present invention. Referring to FIG. 1, in an embodiment of the present invention, the system 100 comprises a cloud deployment configuration generation subsystem 102, a user device 110, a source code repository 112, a Continuous Integration/Continuous Deployment unit (CI/CD) 134, an Integrated Development Environment (IDE) unit 136 and a database 138. In an exemplary embodiment of the present invention, the user device 110 may include electronic devices associated with a user such as, a smartphone, a computer and a laptop. The user may be a developer of the application. The user device 110, the source code repository 112, the Continuous Integration/Continuous Deployment unit (CI/CD) 134, the Integrated Development Environment (IDE) unit 136 and the database 138 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a local area network (LAN), a metropolitan area network (MAN) and a wide area network (WAN).

In an embodiment of the present invention, the subsystem 102 is configured with a built-in mechanism for optimized generation of cloud deployment configurations for an application. The subsystem 102 is configured to render a User Interface (UI) to capture data from the user, associated with an application which needs to be created and deployed on a cloud platform. The subsystem 102 further provides generation of various functionalities associated with cloud deployment configurations for the application including, but are not limited to, optimized generation of one or more application source code templates along with one or more managed services for a target cloud platform, generation of resource definitions, creating CI/CD pipeline, validating the resource definitions in the pipeline, and creating a package for application that may be the part of the pipeline for application deployment to the cloud platform. The managed services may include, but are not limited to, Amazon® RDS, Azure® service bus, and Google® cloud storage.

In an embodiment of the present invention, the subsystem 102 comprises a cloud deployment configuration generation engine 104 (engine 104), a processor 106, and a memory 108. In various embodiments of the present invention, the engine 104 has multiple units which work in conjunction with each other for automating generation of cloud deployment configurations for an application. The various units of the engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as Software as a Service (SaaS) over a communication network.

In another embodiment of the present invention, the subsystem 102 may be implemented as a client-server architecture. In this embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the engine 104 comprises a user interface configuration unit 114, a deployment visualization unit 116, an application source code generation unit 118, a resource generator unit 120, a pod packager unit 122, a pipeline generation unit 124, a service mesh resource generation unit 126, a resource validation unit 128, a template manager unit 130, and a cloud deployment unit 132.

In operation, in an embodiment of the present invention, the user interface configuration unit 114 is configured to render a user-friendly wizard at the user-end via a graphical user interface (GUI) on the user device 110 for capturing input data associated with application. In an embodiment of the present invention, the input data is provided in the form of one or more parameters associated with application deployment configuration generation and deployment to the cloud platform which are selected via the GUI. In an exemplary embodiment of the present invention, the one or more parameters may include, but are not limited to, application source code development technologies stack (e.g., Java/.Net), application source code development framework and one or more managed services in the target cloud platform (e.g., Amazon Web Services® (AWS), Azure®, Google Cloud Platform® (GCP)) for application deployment that may be integrated with the application using cloud provider provided Software Development Kits (SDKs). Further, the GUI enables to define the source code repository 112 (e.g., Github®, Gitlab®, or Bitbucket®) details in which the target application source code is required to be pushed. In an embodiment of the present invention, one or more options are selected or deselected on the GUI which are provided in the wizard based on the needs and requirements associated with the application deployment configuration generation. The wizard rendered on the GUI integrates suitably with existing configuration management tools such as, but are not limited to, GitHub®, etc. by generating configurations based on the inputs provided via the GUI. FIGS. *2a-2d* illustrate an exemplary GUI rendered on the user device 110 for capturing input data associated with the application generation and deployment to the cloud platform. The GUI renders a step-by-step wizard to capture the input data for application deployment configuration generation and deployment to the cloud platform. Further, an option is rendered on the GUI to customize the one or more parameters required for application generation and deployment to the cloud platform. In an embodiment of the present invention, the one or more parameters captured from the GUI are converted to a JSON file by the user interface configuration unit 114, which are transmitted to the application source code generation unit 118.

In an embodiment of the present invention, the application source code generation unit 118 is configured to receive the selected one or more parameters associated with application generation and deployment of application to the cloud platform. The application source code generation unit 118 is configured to process the one or more parameters for generating an application source code template. The application source code template is generated by stitching the one or more parameters (such as, managed services) based on the target cloud platform Software Development Kit (SDK) with necessary cloud platform components. The stitching is carried out by creating a configuration necessary for the application to connect to the managed services. In an exemplary embodiment of the present invention, the application source code template may be generated by using a computer programming language such as, but not limited to, .Net, and Java. In an embodiment of the present invention, a branch is created in the source code repository 112 by the application source code generation unit 118 with the application source code template. The branch represents a construct in the source code repository 112 which isolates the changes made by a developer to the source code.

In an embodiment of the present invention, subsequent to generation of the application source code template by the application source code generation unit 118, the resource generator unit 120 is configured to generate cloud deployment configuration files based on the generated template.

The cloud deployment configuration files are stored in the database 138. Examples of cloud deployment configuration files are deployment service, config maps and secret YAML definition files for the application. In an embodiment of the present invention, the resource generator unit 120 is configured to store the cloud deployment configuration files by encoding the secret YAML definition files as base64 or selecting a Secret Management Service (e.g., Key Vault) to encrypt the cloud deployment configuration files. In another embodiment of the present invention, the resource generator unit 120 is further configured to create a deployment and service YAML definition for application deployment. In yet another embodiment of the present invention, if the application requires file storage in the target cloud platform, then the resource generator unit 120 is configured to create a storage based on a storage request in the target cloud platform using the storage provided in the cloud platform and thereafter attach the file storage to the deployment YAML definition. For example, a Persistent Volume (PV) in the Kubernetes® is created in the target cloud platforms and a storage request in the form of a Persistent Volume Claim (PVC) is created using the storage provided in the target cloud platforms.

In an embodiment of the present invention, the pod packager unit 122 is configured to automate package deployment associated with application deployment for abstracting packaging applications which are targeted to be deployed on the cloud platform. The pod packager unit 122 is capable of being plugged-in or integrated with a workflow during generation of pipeline by the pipeline generation unit 124. In an embodiment of the present invention, the pod packager unit 122 is configured to integrate with Application Programing Interfaces (API) such as, but are not limited to, developer IDEs, GitHub®, Kubectl®, etc. to abstract and automate the packaging and deployment of applications in cloud platform based on cloud deployment configuration. In another embodiment of the present invention, the pod packager unit 122 is configured to resolve issues associated with applications having hybrid cloud deployment requirements by executing hybrid cloud deployment parameters such as, but are not limited to, storage, ingress, and backing services across Infrastructure as a service (IaaS) provider.

In an embodiment of the present invention, the pipeline generator unit 124 is configured to process one or more pipeline inputs (e.g., Jenkins® or Bamboo®) associated with a target cloud platform provided on the GUI for determining one or more cloud deployment configuration constraints associated with the application source code. The constraints may include, but are not limited to, generating a pipeline for pulling the application source code from the source code repository 112 for CI/CD via the CI/CD unit 134, validating the cloud resource definitions associated with the cloud deployment configurations via the resource validation unit 128, and customizing the cloud deployment configuration parameters provided on the GUI in the form of the workflow. In another embodiment of the present invention, artifacts are generated during processing of the target pipeline inputs and the pipeline generator unit 124 is configured to store the generated artifacts in an artifact repository (not shown) (e.g., JFrog®). The artifacts may include, but are not limited to, application binary, and container images. The generated artifacts are utilized while deploying the applications to the target cloud platform.

In an embodiment of the present invention, the service mesh resource generation unit 126 is configured to generate service mesh configuration files for deployment of application to the cloud platform. The service mesh resource generation unit 126 is configured to generate the service mesh configuration files by processing the one or more cloud deployment configuration constraints associated with the application source code. An example of a cloud deployment configuration constraint is a gateway YAML, which is generated only when the application needs to be deployed outside the Kubernetes® cluster. The service mesh configuration files may include, but are not limited to, destination rule, and service entry YAML. The service mesh resource generation unit 126 is configured to employ one or more routing techniques such as, but are not limited to, ingress gateway technique, virtual service technique and destination rules for transmitting the generated cloud deployment configurations associated with the application to the resource validation unit 128.

In an embodiment of the present invention, the resource validation unit 128 is configured to carry out a validation operation for validating the generated cloud deployment configurations. The validation operation involves analyzing that the cloud resource definitions (e.g., YAML) meet the required standards based on the best practices associated with the application deployment to the cloud platform. The best practices may include, but are not limited to, deployment YAMLS having relevant labels, deployment YAML having liveness and readiness probes, and secrets mounted as volumes. In the event, the resource validation unit 128 determines issues reflecting that the best practices have not been met, these issues are flagged as an error or warning, which may be resolved by a Subject Matter Expert (SME), in an embodiment of the present invention. The flagging of issues by the resource validation unit 128 stops the deployment of applications in the target cloud platform by the cloud deployment unit 132. Further, the resource validation unit 128 is configured to perform the validation operation for a specific version of cloud platform in which the application needs to be deployed. In another embodiment of the present invention, an option may be added as a pre-defined rule to the resource validation unit 128 via the GUI based on the enterprise recommendation for validating the generated cloud deployment configurations. The option may include, but is not limited to, a rule for providing relevant labels for deployment YAMLS, a rule for providing liveness and readiness probes for deployment YAML having, and a rule for mounting secrets as volumes.

In an embodiment of the present invention, subsequent to the validation of the generated cloud deployment configurations by the resource validation unit 128, the template manager unit 130 is configured to generate a cloud deployment template as a package manager for cloud deployment of applications.

In an embodiment of the present invention, the cloud deployment unit 132 is configured to employ the cloud deployment template for deploying the applications to a desired cloud platform. The cloud deployment unit 132 is configured to deploy the application source code associated with the application to the desired cloud platform. The cloud platform to which the application source code may be deployed may include, but is not limited to, Elastic Kubernetes Service® (EKS), Azure Kubernetes Service® (AKS), Google Kubernetes Engine® (GKE), Amazon Web Services (AWS), Google Cloud Platform® (GCP), Kubernetes Private Cloud®, Hybrid Cloud®, etc.

In an embodiment of the present invention, the cloud deployment unit 132 is configured to deploy the applications to the desired cloud platform by communicating with the CI/CD unit 134. The CI/CD unit 134 is configured to deploy the applications to the desired cloud platform based on one or more automation tools such as, but are not limited to, Jenkins®, Spinnaker®, Tekton®, and Bamboo®. In an embodiment of the present invention, the CI/CD unit 134 is further configured to communicate with the IDE unit 136 for deploying the applications to the desired cloud platform. The IDE unit 136 is configured with plugins to generate a 'values.yaml file' for packaging and deploying the applications to the desired cloud platform by the CI/CD unit 134. In another embodiment of the present invention, in the event one or more cloud native applications that are being developed are not deployed on the target cloud platform (such as, Kubernetes®), then a Dockerfile is created and further necessary cloud deployment configuration resources are created by the service mesh resource generation unit 126 such as, but not limited to, deployments, pods, services, configuration maps (config maps) and secrets for generating the cloud deployment configuration. Further, YAML definitions associated with the created Dockerfile, and cloud deployment configuration resources may be validated by the resource validator unit 128.

In an embodiment of the present invention, the deployment visualization unit 116 is configured to communicate with the cloud deployment unit 132 for providing visualization of the cloud deployment configuration constraints and the manner of deployment of the cloud deployment configurations in the target cloud platform via the GUI. In an embodiment of the present invention, the deployment visualization unit 116 is configured to render an option on the GUI to view and edit the cloud deployment configuration constraints associated with the application, subsequent to application's deployment in the desired cloud platform. Further, the cloud deployment configuration constraints may be modified via the GUI and thereafter the modifications to the cloud deployment configuration constraints are automatically deployed as a new version on the target cloud platform. In another embodiment of the present invention, the deployment visualization unit 116 is configured to render an option on the GUI for reverting to the previous version of the cloud deployment configuration constraints or the previous version of the cloud deployment configuration constraints are removed.

Figure 3:
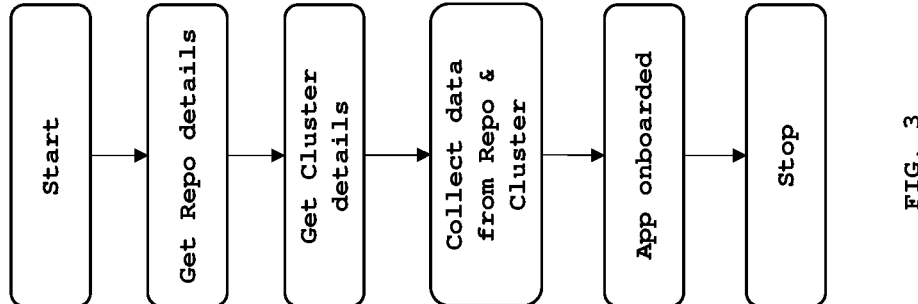
FIG. 3 illustrates a first workflow which is triggered for fetching an application from a source code repository, in accordance with an embodiment of the present invention.

In an exemplary embodiment of the present invention, one or more workflows are triggered by the engine 104 for carrying out functionalities associated with application generation and deployment to cloud platform. In an exemplary embodiment of the present invention, a first workflow is triggered for fetching the application from the source code repository 112, as illustrated in FIG. 3. As shown in FIG. 3, application is onboarded to the engine 104 for utilizing various functionalities provided by the engine 104. Onboarding of the application is carried out by fetching the source code repository 112 and cloud deployment data from the GUI. Further, subsequent to fetching of the source code repository 112 and cloud deployment data, the engine 104 connects to the source code repository 112 for collecting the data associated with the application. The data associated with the application may include, but is not limited to, programming language of the application, frameworks used in the application, type of the application, the type of cloud platform on which the application is to be deployed, namespace metadata associated with the application, and type of volumes available for deploying of the application in the cloud platform.

Figure 4:
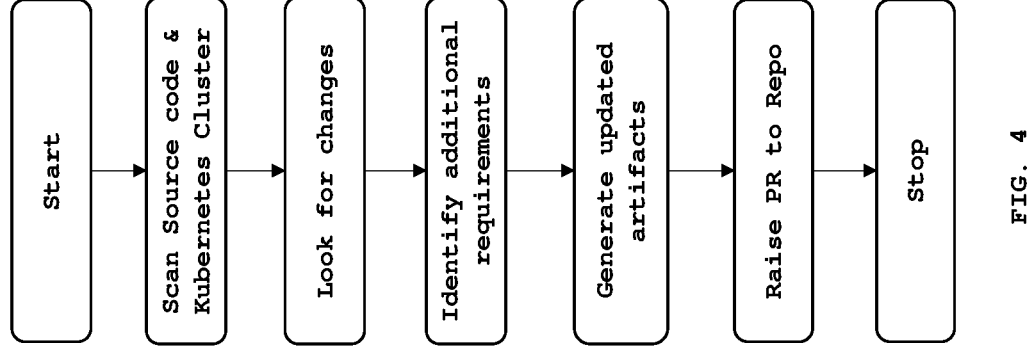
FIG. 4 illustrates a second workflow which is triggered if there is any change in the source code repository or the cloud platform in which the application is deployed, in accordance with an embodiment of the present invention.

In an exemplary embodiment of the present invention, a second workflow is triggered by the engine 104 if there is any change in the source code repository 112 or the cloud platform in which the application is deployed, as illustrated in FIG. 4. The engine 104 analyzes the source code repository 112 and the cloud platform in which the application is deployed. In the event of a change in either one of the source code repository 112 or the cloud platform, the engine 104 triggers the second workflow. The current state of the source code repository 112 and the cloud platform (after the change) are compared with the generated artifacts. Thereafter, the engine 104 identifies if an artifact update is required or not. In the event an artifact update is required, the engine 104 regenerates the artifacts to provide the changes made in the source code repository 112 and the cloud platform. Thereafter, a pull request is created in the source code repository 112 to update the artifacts based on the regenerated artifacts. The pull request may be reviewed, and the changes may be accepted.

Figure 5:
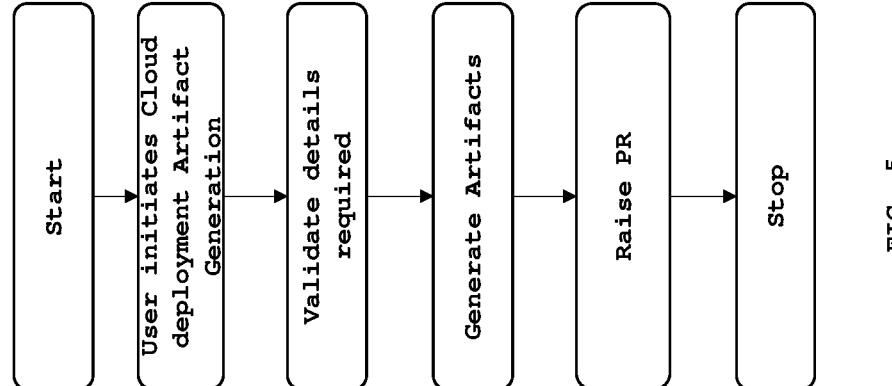
FIG. 5 illustrates a third workflow which is triggered if an artifact generation is initiated, in accordance with an embodiment of the present invention.

In an exemplary embodiment of the present invention, a third workflow is triggered by the engine 104 if an artifact generation is initiated, as illustrated in FIG. 5. The engine 104 is configured to generate the artifacts based on the inputs received from the GUI. The artifacts are generated without requiring a change in the source code repository 112 or the cloud platform. Further, if artifact generation is initiated, then the engine 104 validates the artifacts generation data, generates the artifacts, and creates a pull request for the source code repository 112.

Figure 6:
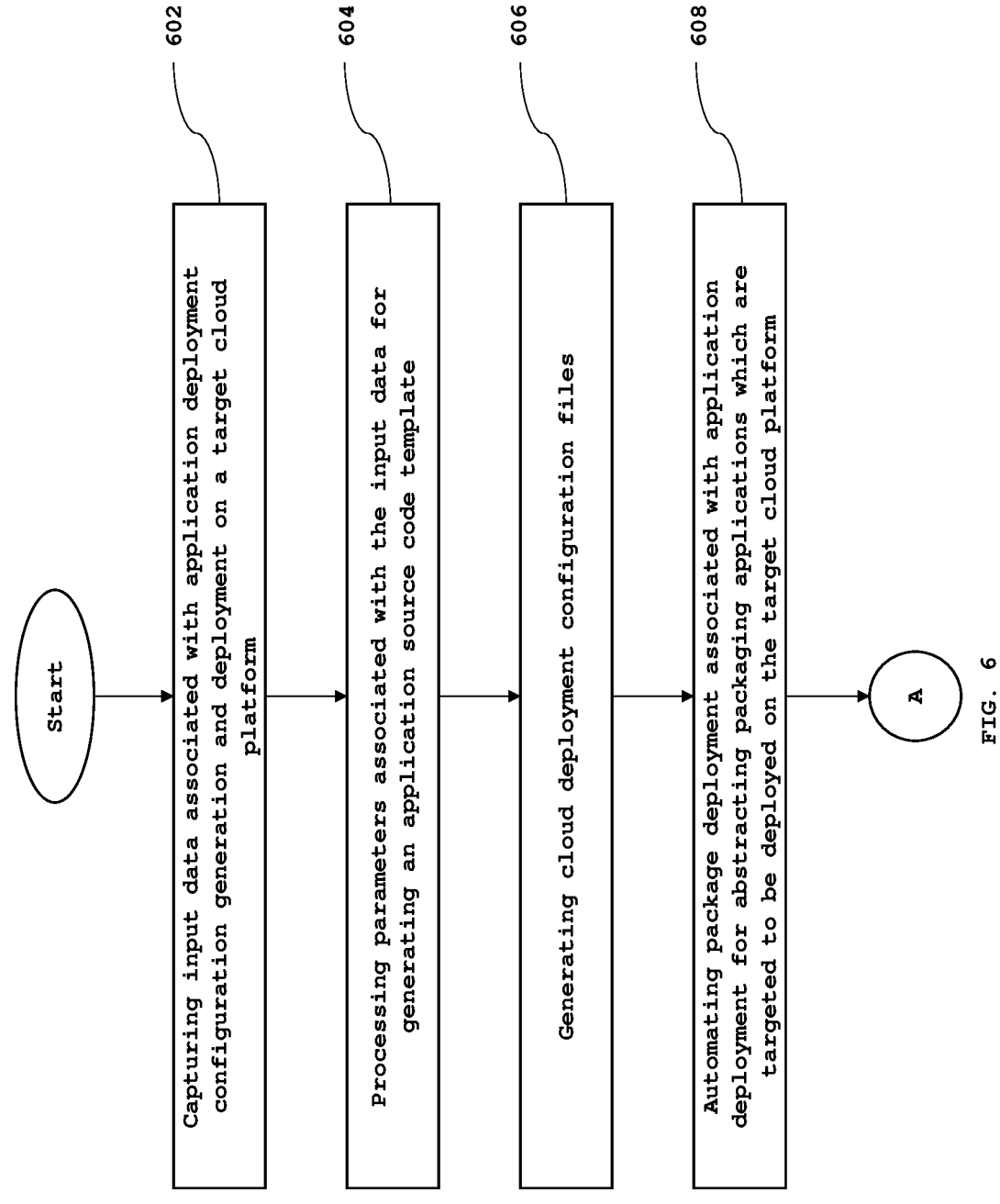
FIG. 6 and FIG. 6A illustrate a flowchart depicting a method for optimized generation of cloud deployment configuration for an application, in accordance with an embodiment of the present invention.
Figure 6A:
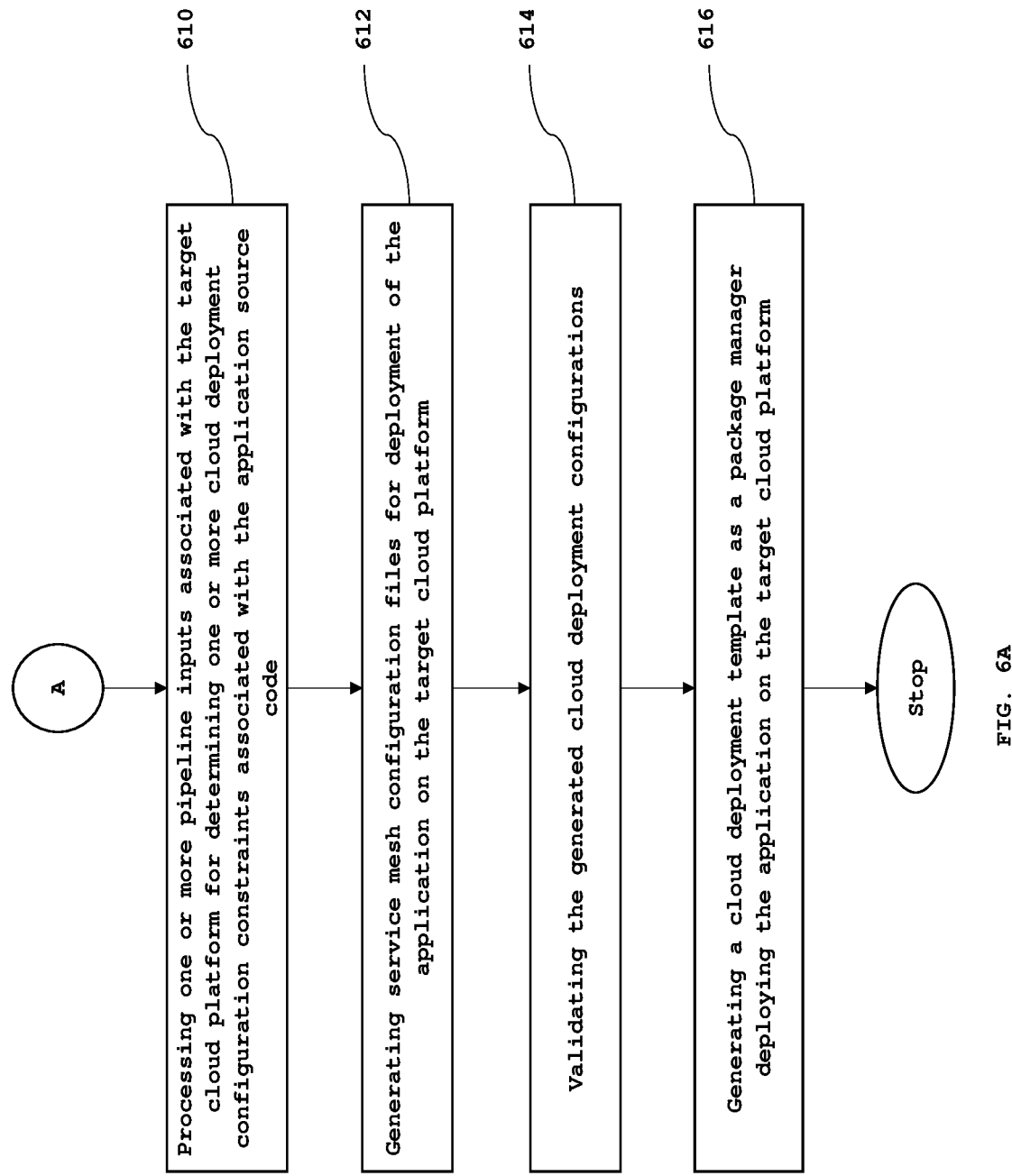

FIG. 6 and FIG. 6A illustrate a flowchart depicting a method for optimized generation of cloud deployment configuration for an application, in accordance with various embodiments of the present invention.

At step 602, input data associated with application deployment configuration generation and deployment on a target cloud platform are captured. In an embodiment of the present invention, a user-friendly wizard is rendered at the user end via a graphical user interface (GUI) for capturing input data associated with application. The input data is provided in the form of one or more parameters associated with application deployment configuration generation and deployment to the cloud platform are selected via the GUI. In an exemplary embodiment of the present invention, the one or more parameters may include, but are not limited to, application source code development technologies stack (e.g., Java/.Net), application source code development framework and one or more managed services in the target cloud platform (e.g., Amazon Web Services® (AWS), Azure®, Google Cloud Platform® (GCP)) for application deployment that may be integrated with the application using cloud provider provided Software Development Kits (SDKs). Further, the GUI enables to define the source code repository 112 (e.g., Github®, Gitlab®, or Bitbucket®) details in which the target application source code is required to be pushed. In an embodiment of the present invention, one or more options rendered on the GUI may be selected or deselected. The options are provided in the wizard via the GUI based on requirements associated with the application generation and deployment. The wizard rendered on the GUI integrates suitably with existing configuration management tools such as, but are not limited to, GitHub®, etc. by generating configurations based on the inputs provided via the GUI. The GUI renders a step-by-step wizard to capture the input data for application deployment configuration generation and deployment to the cloud platform. Further, an option is rendered on the GUI to customize the one or more parameters required for application generation and deployment to the cloud platform. In an embodiment of the present invention, the one or more parameters captured from the GUI are converted to a JSON file.

At step 604, one or more parameters associated with the input data are processed for generating an application source code template. In an embodiment of the present invention, the application source code template is generated by stitching the one or more parameters (such as, managed services) by employing the target cloud platform Software Development Kit (SDK) with necessary cloud platform components. The stitching is carried out by creating a configuration necessary for the application to connect to the managed services. In an exemplary embodiment of the present invention, the application source code template may be generated by using a computer programming language such as, but not limited to, .Net, and Java. In an embodiment of the present invention, a branch is created with the application source code template. The branch represents a construct which isolates the changes made by a developer to the source code.

At step 606, cloud deployment configuration files are generated. In an embodiment of the present invention, subsequent to generation of the application source code template, the cloud deployment configuration files are generated based on the generated template, which is stored in a database as deployment service, config maps and secret YAML definition files for the application. In an embodiment of the present invention, the cloud deployment configuration files are stored by encoding the secret YAML definition files as base64 or selecting a Secret Management Service (e.g., Key Vault) to encrypt the cloud deployment configuration files. In another embodiment of the present invention, a deployment and service YAML definition is created for application deployment. In yet another embodiment of the present invention, if it is determined that the application requires file storage in the target cloud platform, then a storage is created based on a storage request in the target cloud platform using the storage provided in the cloud platform and thereafter the file storage is attached to the deployment YAML definition. For example, a Persistent Volume (PV) in the Kubernetes® is created in the target cloud platforms and a storage request in the form of a Persistent Volume Claim (PVC) is created using the storage provided in the target cloud platforms.

At step 608, package deployment associated with application deployment is automated for abstracting packaging applications which are targeted to be deployed on the target cloud platform. In an embodiment of the present invention, integration with Application Programing Interfaces (API) such as, but are not limited to, developer IDEs®, GitHub®, Kubectl®, etc. is carried out to abstract and automate the packaging and deployment of applications in the cloud platform based on cloud deployment configurations. In another embodiment of the present invention, issues associated with applications having hybrid cloud deployment requirements are resolved based on executing hybrid cloud deployment parameters such as, but are not limited to, storage, ingress, and backing services across Infrastructure as a service (IaaS) provider.

At step 610, one or more pipeline inputs associated with the target cloud platform are processed for determining one or more cloud deployment configuration constraints associated with the application source code. In an embodiment of the present invention, one or more pipeline inputs (e.g., Jenkins® or Bamboo®) associated with a target cloud platform provided on the GUI are processed for determining one or more cloud deployment configuration constraints associated with the application source code. The constraints may include, but are not limited to, generating a pipeline for pulling the application source code from a source code repository 112 for CI/CD, validating the resource definitions associated with the cloud deployment configurations, and customizing the cloud deployment configuration parameters provided on the GUI in the form of the workflow. In another embodiment of the present invention, an artifact is generated during processing of the target pipeline inputs and the generated artifacts are stored in an artifact repository (not shown) (e.g., JFrog®). The artifacts may include, but are not limited to, application binary, and container images. The generated artifacts may be utilized while deploying the applications to the target cloud platform.

At step 612, service mesh configurations files are generated for deployment of the application on the target cloud platform. In an embodiment of the present invention, one or more cloud deployment configuration constraints associated with the application source code are processed to generate the service mesh configuration files. An example of a cloud deployment configuration constraint is a gateway YAML, which is generated only when the application needs to be deployed outside the Kubernetes® cluster. The service mesh configuration files may include, but are not limited to, destination rule, and service entry YAML. In an exemplary embodiment of the present invention, one or more routing techniques such as, but are not limited to, ingress gateway technique, virtual service technique and destination rules for transmitting the generated cloud deployment configurations associated with the application are employed for processing the cloud deployment configuration constraints.

At step 614, the generated cloud deployment configurations are validated. In an embodiment of the present invention, the validation operation involves analyzing that the cloud resource definitions (e.g., YAML) meet the required standards based on the best practices associated with the application deployment to the cloud platform. The best practices may include, but are not limited to, deployment YAMLS having relevant labels, deployment YAML having liveness and readiness probes, and secrets mounted as volumes. In the event, issues reflecting that the best practices have not been met are determined, these issues are flagged as an error or warning, which may be resolved by a Subject Matter Expert (SME), in an embodiment of the present invention. In an embodiment of the present invention, one or more issues associated with the generated cloud deployment configurations are flagged as an error or warning. The flagging of issues stops the deployment of applications in the target cloud platform. Further, the validation operation is performed for a specific version of the cloud platform in which the application needs to be deployed. In another embodiment of the present invention, an option may be added as a pre-defined rule via the GUI based on the enterprise recommendation for validating the generated cloud deployment configurations. The option may include, but is not limited to, a rule for providing relevant labels for deployment YAMLS, a rule for providing liveness and readiness probes for deployment YAML having, and a rule for mounting secrets as volumes.

At step 616, a cloud deployment template is generated as a package manager for deploying the application on the target cloud platform. In an embodiment of the present invention, subsequent to the validation of the generated cloud deployment configurations, a cloud deployment template is generated as a package manager for cloud deployment of applications. In an embodiment of the present invention, the cloud deployment template is used for deploying the applications on a desired cloud platform (target cloud platform). The application source code associated with the application is deployed on the target cloud platform. The cloud platform to which the application source code is deployed includes, but is not limited to, Elastic Kubernetes Service® (EKS), Azure Kubernetes Service® (AKS), Google Kubernetes Engine® (GKE), Amazon Web Services® (AWS), Google Cloud Platform® (GCP), Kubernetes Private Cloud®, Hybrid Cloud®, etc.

In an embodiment of the present invention, the applications are deployed on the target cloud platform. The applications are deployed on the target cloud platform by employing one or more automation tools such as, but are not limited to, Jenkins®, Spinnaker®, Tekton®, and Bamboo®. In an embodiment of the present invention, plugins are used to generate a 'values.yaml file' for packaging and deploying the applications on the desired cloud platform. In another embodiment of the present invention, in the event one or more cloud native applications that are being developed are not deployed on a specific cloud platform (such as, target cloud platform Kubernetes®), then a Dockerfile is created, and further necessary cloud deployment configuration resources are created. Examples of cloud deployment configuration resources include, but are not limited to, deployments, pods, services, configuration maps (config maps) and secrets for generating the cloud deployment configuration. Further, YAML definitions associated with the created Dockerfile, and cloud deployment configuration resources may be validated.

In an embodiment of the present invention, visualization of the cloud deployment configuration constraints and the manner of deployment of the cloud deployment configurations in the target cloud platform are provided via the GUI. In an embodiment of the present invention, an option is rendered via the GUI to view and edit the cloud deployment configuration constraints associated with the application, subsequent to application's deployment in the desired cloud platform. Further, the cloud deployment configuration constraints may be modified on the GUI and thereafter the modifications to the cloud deployment configuration constraints are automatically deployed as a new version in the target cloud platform. In another embodiment of the present invention, an option is rendered via the GUI for reverting to the previous version of the cloud deployment configuration constraints or the previous version of the cloud deployment configuration constraints is deleted.

Advantageously, in accordance with various embodiments of the present invention, the present invention provides for optimizing generation of cloud deployment configurations for an application in an efficient manner. The present invention provides for reducing initial application development efforts, and creation of resource definition files that are required for cloud platform deployment of the application. The present invention provides features that aids the application developer to plug and play functionalities using the GUI. The present invention provides for integrating the subsystem 102 with one or more existing source control tools easily without any changes to the configurations of the existing tools. The present invention provides for flexible deployment of applications to cloud platforms. The present invention provides for deployment of applications to cloud platform with very minimal know how of cloud platforms. The present invention provides for deployment of the applications to the cloud platforms based on best practices associated with enterprises. The present invention provides for customizing the subsystem 102 by employing custom plugins that may be leveraged in the enterprise. The present invention provides for reducing human intervention by avoiding huge learning curve for learning the packaging of the applications and other template language for cloud deployment. The present invention provides for overcoming the lack of support in IDEs for creating and manipulating the deployment and packaging files. The present invention provides for creating the cloud deployment eco-system for the enterprise. The present invention provides for robust process and uniformity associated with cloud platform packaging and deployment across the enterprise. The present invention provides for verifying the cloud platform parameters against pre-defined enterprise standards and best practices. Further, the present invention provides for removing inconsistencies in packaging and deployment of applications to cloud platform thereby easing creation of CI/CD pipeline. Further, the present invention provides for efficient upgradation and versioning of microservices. Also, the present invention provides for processing cloud platform provider specific changes for packaging and deployment of applications to hybrid cloud platforms. Further, the present invention provides for a plug and play option based on requirements of enterprises based on plugins to integrate with existing CI/CD and IDE tools to carry out packaging and deployment of applications. Furthermore, the present invention provides for implementing uniform processes in packaging and deployment of applications to cloud platform in a multi-vendor scenario at enterprise level. Yet further, the present invention provides for integrating the subsystem 102 easily with existing application development tools and pipeline associated with the applications targeted for specific cloud platform in a multi-cloud environment.

Figure 7:
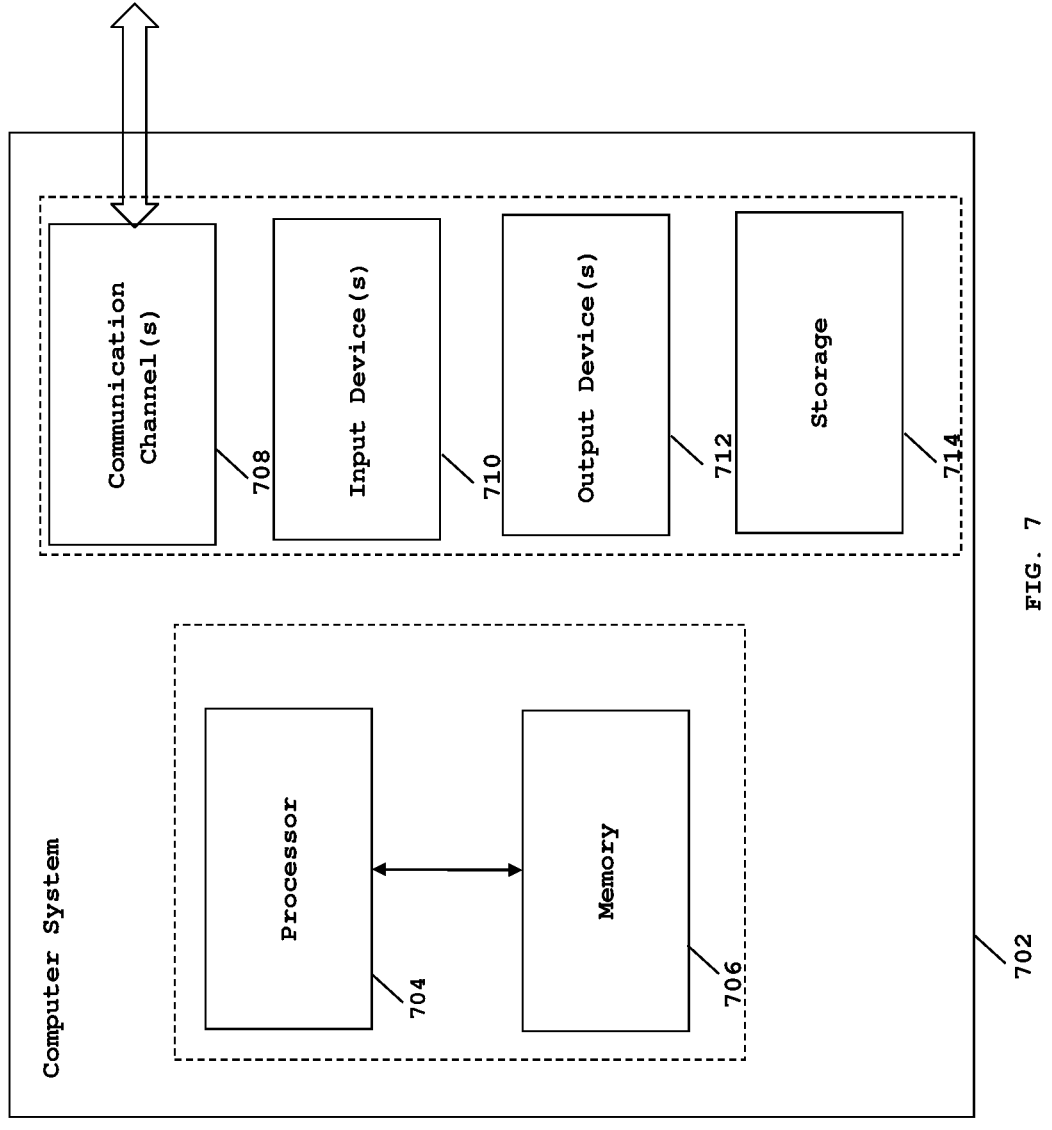
FIG. 7 illustrates an exemplary computer system in which various embodiments of the present invention may be implemented.

FIG. 7 illustrates an exemplary computer system in which various embodiments of the present invention may be implemented. The computer system 702 comprises a processor 704 and a memory 706. The processor 704 executes program instructions and is a real processor. The computer system 702 is not intended to suggest any limitation as to scope of use or functionality of described embodiments. For example, the computer system 702 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing various embodiments of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 710 may include, but not limited to, a keyboard, mouse, pen, joystick, trackball, a voice device, a scanning device, touch screen or any another device that is capable of providing input to the computer system 702. In an embodiment of the present invention, the input device(s)

710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In various embodiments of the present invention, the storage 714 contains program instructions for implementing the described embodiments.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for optimized generation of cloud deployment configurations for an application, the system comprising:
  a memory storing program instructions;
  a processor executing instructions stored in the memory; and
  a cloud deployment configuration generation engine executed by the processor and configured to:
  receive one or more parameters associated with application deployment configuration generation and deployment of the application on a target cloud platform;
  process the one or more parameters for generating an application source code template;
  generate cloud deployment configuration files based on the generated application source code template;
  automate package deployment associated with the application deployment by integrating with Application Programing Interfaces (API) for abstracting packaging applications to be deployed on the target cloud platform;

process one or more pipeline inputs associated with the target cloud platform for determining one or more cloud deployment configuration constraints associated with the generated cloud deployment configuration files corresponding to an application source code;
  generate service mesh configuration files for deployment of the application on the target cloud platform by processing the one or more cloud deployment configuration constraints associated with the application source code; and
  generate a cloud deployment template for deploying the application associated with the application source code on the target cloud platform.

2. The system as claimed in claim 1, wherein the one or more parameters comprises application source code development technologies stack, application source code development framework and one or more managed services in the target cloud platform for application deployment that are integrated with the application using software development kits.

3. The system as claimed in claim 1, wherein the cloud deployment configuration generation engine receives details associated with source code repository, to which the application source code is required to be pushed, via a Graphical User Interface (GUI) rendered on a user device, and wherein a wizard rendered on the GUI provides one or more options for selection and deselection based on requirements associated with the application deployment configuration generation, the wizard integrates with existing configuration management tools by generating configurations based on the parameters provided as inputs via the GUI.

4. The system as claimed in claim 1, wherein the cloud deployment configuration generation engine comprises a user interface configuration unit executed by the processor and configured to convert the one or more parameters to a JSON file and transmits the JSON file to an application source code generation unit.

5. The system as claimed in claim 1, wherein the application source code template is generated by stitching the one or more parameters based on a software development kit associated with the target cloud platform with necessary cloud platform components, and wherein the stitching is carried out by creating a configuration necessary for the application to connect to managed services in the target cloud platform.

6. The system as claimed in claim 1, wherein the cloud deployment configuration generation engine comprises a resource generator unit executed by the processor and configured to store the cloud deployment configuration files in a database as one or more deployment, service, config maps and secret YAML definition files for the application, and wherein the secret YAML definition files are encoded as base64, or a secret management service is selected to encrypt the cloud deployment configuration files, and wherein the resource generator unit is configured to create a deployment and service YAML definition for application deployment.

7. The system as claimed in claim 6, wherein the resource generator unit creates a storage based on a storage request in the target cloud platform, if is determined that the application requires file storage in the target cloud platform, by using the storage provided in the cloud platform and thereafter attaches the file storage to the deployment YAML definition.

8. The system as claimed in claim 1, wherein the cloud deployment configuration generation engine comprises a pod packager unit executed by the processor and configured to plug-in or integrate with a workflow during generation of the pipeline by a pipeline generation unit, and wherein the pod packager unit is configured to integrate with the Application Programing Interfaces (API) to abstract and automate the packaging and deployment of the application in the target cloud platform based on the cloud deployment configuration.

9. The system as claimed in claim 8, wherein the pod packager unit is configured to resolve issues associated with applications having hybrid cloud deployment requirements by executing hybrid cloud deployment parameters comprising storage, ingress, and backing services across Infrastructure as a Service (IaaS) provider.

10. The system as claimed in claim 1, wherein the cloud deployment configuration generation engine comprises a Continuous Integration and Continuous Deployment (CI/CD) unit executed by the processor and configured to determine the cloud deployment configuration constraints by generating a pipeline for pulling the application source code from a source code repository for continuous integration and continuous deployment, validating cloud resource definitions associated with the cloud deployment configurations via a resource validation unit, and customizing the parameters in the form of a workflow.

11. The system as claimed in claim 1, wherein the cloud deployment configuration generation engine comprises a pipeline generator unit executed by the processor and configured to store artifacts generated during processing of the one or more pipeline inputs in an artifact repository, and wherein the generated artifacts are utilized while deploying the applications on the target cloud platform.

12. The system as claimed in claim 1, wherein the cloud deployment configuration generation engine comprises a service mesh resource generation unit executed by the processor and configured to employ one or more routing techniques comprising an ingress gateway technique, a virtual service technique and one or more destination rules for transmitting the generated cloud deployment configurations associated with the application to a resource validation unit.

13. The system as claimed in claim 1, wherein the cloud deployment configuration generation engine comprises a resource validation unit executed by the processor and configured to carry out a validation operation for validating the generated cloud deployment configurations, and wherein the resource validation unit is configured to flag one or more issues associated with the generated cloud deployment configurations as an error or warning, the flagging of issues by the resource validation unit stops the deployment of applications in the target cloud platform by a cloud deployment unit.

14. The system as claimed in claim 13, wherein the resource validation unit is configured to perform the validation operation for a specific version of the target cloud platform in which the application needs to be deployed, and wherein an option is added as a pre-defined rule to the resource validation unit via a GUI based on a recommendation for validating the generated cloud deployment configurations.

15. The system as claimed in claim 1, wherein the cloud deployment configuration generation engine comprises a cloud deployment unit executed by the processor and configured to deploy the applications on the target cloud platform by communicating with a CI/CD unit, and wherein the CI/CD unit is configured to deploy the applications to the target cloud platform by communicating with an Integrated Development Environment (IDE) unit employing one or more automation tools, and wherein the IDE unit is configured with plugins to generate a 'values.yaml file' for packaging and deploying the applications on the target cloud platform by the CI/CD unit.

16. The system as claimed in claim 15, wherein in the event one or more cloud native applications that are being developed are not deployed on the target cloud platform, then a Dockerfile is created and necessary cloud deployment configuration resources are created by a service mesh resource generation unit comprising deployments, pods, services, configuration maps (config maps) and secrets for generating the cloud deployment configuration.

17. The system as claimed in claim 1, wherein the cloud deployment configuration generation engine comprises a deployment visualization unit executed by the processor and configured to communicate with a cloud deployment unit for providing visualization, of the cloud deployment configuration constraints and manner of deployment of the cloud deployment configurations on the target cloud platform via a graphical user interface.

18. The system as claimed in claim 1, wherein the cloud deployment configuration generation engine comprises a deployment visualization unit executed by the processor and configured to render an option via a Graphical User Interface (GUI) to view and edit the cloud deployment configuration constraints associated with the application, subsequent to application's deployment on the target cloud platform, and wherein the cloud deployment configuration constraints are modified via the GUI and thereafter the modifications to the cloud deployment configuration constraints are automatically deployed as a new version on the target cloud platform, and wherein the deployment visualization unit is configured to render an option via the GUI for reverting to the previous version of the cloud deployment configuration constraints or the previous version of the cloud deployment configuration constraints which are removed.

19. A method for optimized generation of cloud deployment configurations for an application, the method is implemented by a processor executing instructions stored in a memory, the method comprises:

receiving one or more parameters associated with application deployment configuration generation and deployment of the application on a target cloud platform;

processing the one or more parameters for generating an application source code template;

generating cloud deployment configuration files based on the generated application source code template;

automating package deployment associated with the application deployment by integrating with Application Programing Interfaces (API) for abstracting packaging applications which are targeted to be deployed on the target cloud platform;

processing one or more pipeline inputs associated with the target cloud platform for determining one or more cloud deployment configuration constraints associated with the generated cloud deployment configuration files corresponding to an application source code;

generating service mesh configuration files for deployment of the application on the target cloud platform by processing the one or more cloud deployment configuration constraints associated with the application source code; and generating a cloud deployment template for deploying the application associated with the application source code on the target cloud platform.

20. The method as claimed in claim 19, wherein the one or more parameters comprises application source code development technologies stack, application source code development framework and one or more managed services in the target cloud platform for application deployment that are integrated with the application using software development kits.

21. The method as claimed in claim 19, wherein the step of receiving one or more parameters comprises receiving, via a Graphical User Interface (GUI) rendered on a user device (110), source code repository (112) details in which the application source code is required to be pushed, and wherein one or more options are provided via a wizard on the GUI for selection and deselection based on requirements associated with the application deployment configuration generation, and wherein the wizard rendered on the GUI integrates with existing configuration management tools by generating configurations based on the parameters provided as inputs via the GUI.

22. The method as claimed in claim 21, wherein the step of processing the one or more parameters comprises converting the parameters captured from the GUI to a JSON file.

23. The method as claimed in claim 19, wherein the step of processing the parameters for generating the application source code template comprises stitching the one or more parameters based on a software development kit associated with the target cloud platform with necessary cloud platform components, and wherein the stitching is carried out by creating a configuration necessary for the application to connect to managed services.

24. The method as claimed in claim 19, wherein the cloud deployment configuration and sensitive data associated with cloud deployment configurations are stored in a database (138) as one or more deployment, service, config maps and secret YAML definition files, and wherein the secret YAML definition files are encoded as base64, or a secret management service is selected to encrypt the cloud deployment configuration files, and wherein a deployment and service YAML definition for application deployment is created.

25. The method as claimed in claim 19, wherein the step of generating the cloud deployment configuration constraints comprises generating a pipeline for pulling the application source code from a source code repository (112) for continuous integration and continuous deployment, validating resource definitions associated with the cloud deployment configurations, and customizing the parameters in the form of a workflow.

26. The method as claimed in claim 19, wherein the step of processing the pipeline inputs comprises generating one or more artifacts and storing the generated artifacts in an artifact repository, and wherein the generated artifacts are utilized while deploying the applications on the target cloud platform.

27. The method as claimed in claim 19, wherein the method comprises carrying out a validation operation for validating the generated cloud deployment configurations, and wherein one or more issues associated with the generated cloud deployment configurations are flagged as an error or warning, the flagging of issues stops the deployment of applications on the target cloud platform.

28. The method as claimed in claim 27, wherein the validation operation is performed for a specific version of the target cloud platform in which the application needs to be deployed, and wherein an option is added as a pre-defined rule via a graphical user interface based on a recommendation for validating the generated cloud deployment configurations.

29. The method as claimed in claim 19, wherein the step of generating the cloud deployment template for deploying the application associated with the application source code on the target cloud platform comprises employing on one or more automation tools, and plugins to generate a 'values.yaml file' for packaging and deploying the applications on the target cloud platform.

30. A computer program product comprising:
a non-transitory computer-readable medium having computer program code stored thereon, the computer-readable program code comprising instructions that, when executed by a processor, causes the processor to:
receive one or more parameters associated with application deployment configuration generation and deployment of the application on a target cloud platform;
process the one or more parameters for generating an application source code template;
generate cloud deployment configuration based on the generated application source code template;
automate package deployment associated with the application deployment by integrating with Application Programing Interfaces (API) for abstracting packaging applications to be deployed on the target cloud platform;
process one or more pipeline inputs associated with the target cloud platform for determining one or more cloud deployment configuration constraints associated with an application source code;
generate service mesh configuration files for deployment of the application to the target cloud platform by processing the one or more cloud deployment configuration constraints associated with the application source code; and
generate a cloud deployment template for deploying the application associated with the application source code to the target cloud platform.

\* \* \* \* \*